United States Patent
Oh et al.

(10) Patent No.: US 7,818,169 B2
(45) Date of Patent: Oct. 19, 2010

(54) FORMANT FREQUENCY ESTIMATION METHOD, APPARATUS, AND MEDIUM IN SPEECH RECOGNITION

(75) Inventors: Kwang Cheol Oh, Seongnam-si (KR); Jae-Hoon Jeong, Yongin-si (KR); So-Young Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 925 days.

(21) Appl. No.: 11/649,161

(22) Filed: Jan. 4, 2007

(65) Prior Publication Data

US 2007/0192088 A1  Aug. 16, 2007

(30) Foreign Application Priority Data

Feb. 10, 2006  (KR) .................. 10-2006-0013124

(51) Int. Cl.
*G10L 15/00* (2006.01)
(52) U.S. Cl. ...................... 704/209; 704/231
(58) Field of Classification Search ............ 704/209, 704/231
See application file for complete search history.

(56) References Cited

U.S. PATENT DOCUMENTS

| 4,882,758 | A | 11/1989 | Uekawa et al. |
| 4,922,539 | A | 5/1990 | Rajasekaran et al. |
| 6,292,775 | B1 | 9/2001 | Holmes |
| 6,505,152 | B1 | 1/2003 | Acero |
| 6,704,708 | B1 | 3/2004 | Pickering |

FOREIGN PATENT DOCUMENTS

| KR | 10-1999-011915 | 2/1999 |
| KR | 10-2004-0088364 | 10/2004 |

*Primary Examiner*—Susan McFadden
(74) *Attorney, Agent, or Firm*—Staas & Halsey LLP

(57) ABSTRACT

A formant frequency estimation method which is important information in speech recognition by accelerating a spectrum using a pitch frequency, and an apparatus using the method is provided. That is, the formant frequency estimation method includes preprocessing an input speech signal and generating a spectrum by a fast Fourier transforming the preprocessed input speech signal; smoothing the generated spectrum; accelerating the smoothed spectrum; and determining a formant frequency on the basis of the accelerated spectrum.

10 Claims, 6 Drawing Sheets

FORMANT FREQUENCY ESTIMATION METHOD, APPARATUS, AND MEDIUM IN SPEECH RECOGNITION

CROSS-REFERENCE TO RELATED APPLICATIONS

This application claims the benefit of Korean Patent Application No. 10-2006-0013124, filed on Feb. 10, 2006, in the Korean Intellectual Property Office, the disclosure of which is incorporated herein by reference.

BACKGROUND OF THE INVENTION

1. Field of the Invention

The present invention relates to a formant frequency estimation method which is important information in speech recognition by accelerating a spectrum using a pitch frequency, and an apparatus using the method.

2. Description of the Related Art

Generally, a formant frequency (hereinafter, referred to as "formant frequency or formants") extracted from a speech signal is mainly utilized in a speech coding, such as a formants vocoder, text-to-speech using a formant frequency and a feature vector in a speech recognizer. Particularly, in speech recognition, a formant frequency is very important information, therefore, a formant frequency is vital information for linguists to distinguish a speech. A formant frequency may be directly utilized as a feature vector of speech recognition and may intensify a component of the speech by a formant component.

In a method of searching for a formant frequency using a conventional technique, a formant frequency is obtained by identifying a local maximum point in a linear prediction spectrum and a cepstrally smoothed spectrum.

First, a speech signal to be processed is filtered as an operation of preprocessing, a quality of the speech signal is enhanced in the signal process or is passed through a pre-emphasis filter. Initially, a short-time signal is extracted by multiplying either a Hamming window or a Kaiser window by an appropriate section, approximately 20 ms to 40 ms, of a speech signal as required. Next, the linear prediction spectrum is obtained or the cepstrally smoothed spectrum is obtained by obtaining a linear prediction coefficient in the short-time signal. Next, after a local maximum point is discovered in the obtained spectrum, a formant frequency corresponding to the local maximum point is obtained. In this instance, error values which may unpredictably occur are filtered by an operation Smoothing as a post-process.

Second, a root of a prediction error filter, that is, the formant frequency is obtained by obtaining a 'zero'. Initially, after the speech signal is passed through a low emphasis filter or a pre-emphasis filter, the short time signal is obtained by multiplying either a Hamming window or a Kaiser window by an appropriate section, approximately 20 ms to 40 ms, of a speech signal as required. Next, a predictable error filter is obtained by calculating the linear prediction coefficient in the short-time signal. Next, after the 'zero' is obtained by resolving the predictable error filter in a method of numerical analysis, by applying the 'zero' to a certain equation, and the formant frequency is obtained. In this instance, error values which may unpredictably occur are filtered by an operation Smoothing as a post-process.

Third, a 'zero' point is gradually searched by dividing a region in a z-region by Cauchy's integral formula. Initially, by using the prediction error filter, a number of the 'zero' is obtained in a fan shaped region of the z-region by using Cauchy's integral formula in an equation embodied as below. Next, except for a region without the 'zero' in the fan shaped, a region with the 'zero' in the fan shaped region is repeatedly bisectioned until the region without the 'zero' has the 'zero', and the bisectioning is repeatedly executed until sufficient precision is achieved. The above described methods using conventional techniques may directly calculate a formant frequency and they are comparatively strong against a noise. However, a harmonic component and a formant component may be difficult to be distinguished and when a colored noise occurs, a formant component and a noise component may not be distinguished. FIG. 1 is a diagram illustrating graphs estimating a formant frequency according to a conventional technique, as shown in an area 101 and 102 of FIG. 1, when a colored noise occurs, it is difficult to distinguish either a format component or a noise component.

SUMMARY OF THE INVENTION

Additional aspects, features, and/or advantages of the invention will be set forth in part in the description which follows and, in part, will be apparent from the description, or may be learned by practice of the invention.

An aspect of the present invention provides a formant frequency estimation method which can reliably estimate a formant frequency by changing a spectrum suitable for the estimation of the formant frequency after smoothing and accelerating the spectrum, and an apparatus using the method.

An aspect of the present invention also provides a formant frequency estimation method which can accurately distinguish between a harmonic component and a formant component by differently executing a smoothing according to a pitch frequency and solve a problem of an occurrence of an amplitude difference according to a size of a formant by executing an acceleration of a spectrum, and an apparatus using the method.

An aspect of the present invention also provides a formant frequency estimation method which can eliminate a tracking error since the formant frequency estimation starts from a section in which a voice is stable, and an apparatus using the method.

According to an aspect of the present invention, there is provided a formant frequency estimation method includes: preprocessing an input speech signal and generating a spectrum by Fast Fourier transforming the preprocessed input speech signal; smoothing the generated spectrum; accelerating the smoothed spectrum; and determining a formant frequency on the basis of the accelerated spectrum.

According to another aspect of the present invention, there is provided a formant frequency estimation method includes: establishing a flag state backward; calculating an anchor parameter after preprocessing an input speech signal; executing buffering until the anchor parameter is above a predetermined threshold value; estimating a backward formant frequency after anchor parameter is above the predetermined threshold value; and changing the flag state and establishing after estimating the backward formant frequency.

Also, the above method may be implemented as a computer readable storage medium storing a program for implementing in a computer.

According to still another aspect of the present invention, there is provided a formant frequency estimation apparatus in speech recognition comprising: a preprocess unit pre-treating an input speech signal; a Fast Fourier transformation unit Fourier transforming a preprocessed input speech signal, and generating a spectrum; a smoothing unit smoothing the generated spectrum; a acceleration unit accelerating the smoothed spectrum; and a determining unit determining a formant frequency on the basis of the accelerated spectrum.

According to yet another aspect of the present invention, there is provided a formant frequency estimation apparatus in speech recognition comprising: a flag state establishment unit establishing a flag sate backward; an anchor parameter calculation unit calculating an anchor parameter after a preprocess of input speech signal; buffering unit executing buffering until the anchor parameter is above a predetermined threshold value; formant frequency estimation unit estimating a backward formant frequency after anchor parameter is above the predetermined threshold value; and wherein the flag state establishment unit changes and establishes the flag state after the estimating backward formant frequency.

According to yet another aspect of the present invention, there is provided a formant frequency estimation method in speech recognition including calculating an anchor parameter from an input speech signal; executing buffering until the anchor parameter is above a predetermined threshold value; and estimating a backward formant frequency after the anchor parameter is above the predetermined threshold value.

Also, the above methods may be implemented as a medium including computer readable instructions for implementing the methods of the present invention.

BRIEF DESCRIPTION OF THE DRAWINGS

These and/or other aspects, features and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
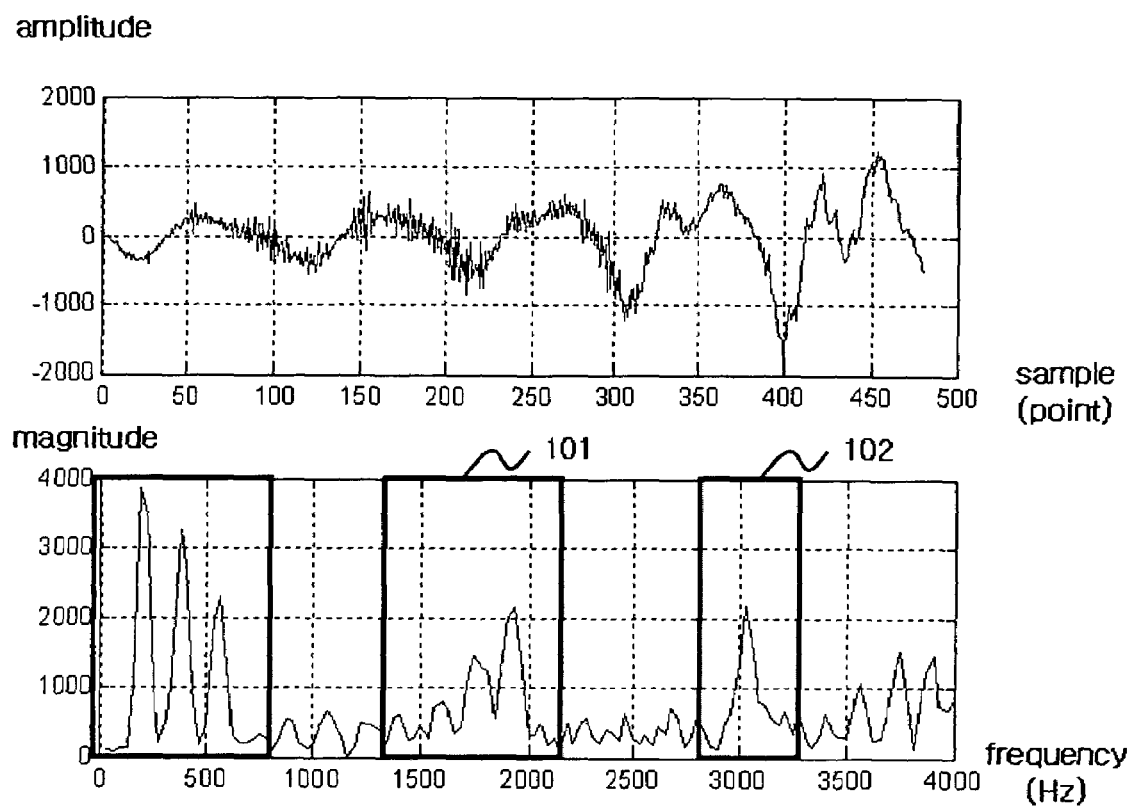
FIG. 1 is a diagram illustrating a graph estimating a formant frequency according to a method using a conventional technique.

Reference will now be made in detail to exemplary embodiments of the present invention, examples of which are illustrated in the accompanying drawings, wherein like reference numerals refer to the like elements throughout. Exemplary embodiments are described below in order to explain the present invention by referring to the figures.

Figure 2:
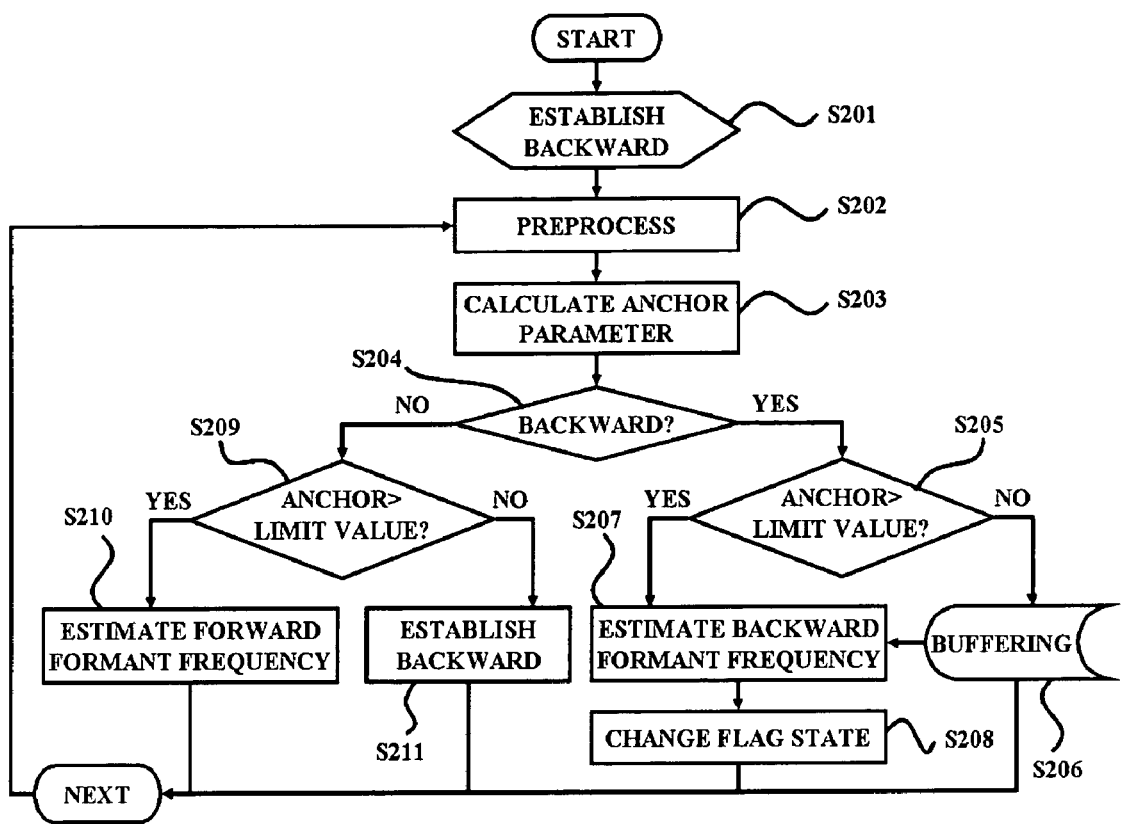
FIG. 2 is a flowchart illustrating a method of estimating a formant frequency according to an exemplary embodiment of the present invention.

FIG. 2 is a flowchart illustrating a method of estimating a formant frequency according to an exemplary embodiment of the present invention. A method of estimating a formant frequency according to this exemplary embodiment is implemented by an exemplary embodiment of a formant frequency estimation apparatus and this formant frequency estimation apparatus will be described later by referring to FIG. 5.

In operation S201, the formant frequency estimation apparatus establishes a flag state backward (backward flag state).

In operation S202, the formant frequency estimation apparatus preprocesses an input speech signal. An anchor parameter is calculated in operation S203. The anchor parameter may be a parameter for a voicing estimation. One of the known methods for voicing estimation may be used for calculating the anchor parameter (U.S. Pat. No. 6,640,208; U.S. Pat. No. 5,809,455; US 2002/006229).

In operation S204, the formant frequency estimation apparatus checks the flag state and moves to operation S205 since the flag state is established backward in operation S201.

In operation S205, the formant frequency estimation apparatus checks whether the anchor parameter is above a certain threshold value.

In operation S206, when the anchor parameter is above the certain threshold value, the formant frequency estimation apparatus executes a buffering until the anchor parameter is above the certain threshold value. In operation S207, when the anchor parameter is above the certain threshold value, the formant frequency estimation apparatus estimates a backward formant frequency.

In this case, a tracking error may be eliminated by starting to estimate the formant frequency from a section in which a vowel is stable.

Specifications regarding an exemplary embodiment of a formant frequency estimation method will be illustrated later by referring to FIG. 3.

In operation S208, the formant frequency estimation apparatus changes the flag state and establishes a flag state not-backward (not-backward flag state) after estimating the backward formant frequency.

After the flag state is changed, the formant frequency estimation apparatus repeats the operations S202 to S204 and moves to operation S209 since the flag state has established not backward.

In the operation S209, the formant frequency estimation apparatus checks whether the anchor parameter, which is repeatedly calculated, is above the threshold value.

In operation S210, when the anchor parameter is above the threshold value, the formant frequency estimation apparatus estimates a forward formant frequency. In operation S211, when the anchor parameter is below the threshold value, the formant frequency estimation apparatus establishes the flag state backward. A specific method estimating a formant frequency will be illustrated as below by referring to FIG. 3.

Figure 3:
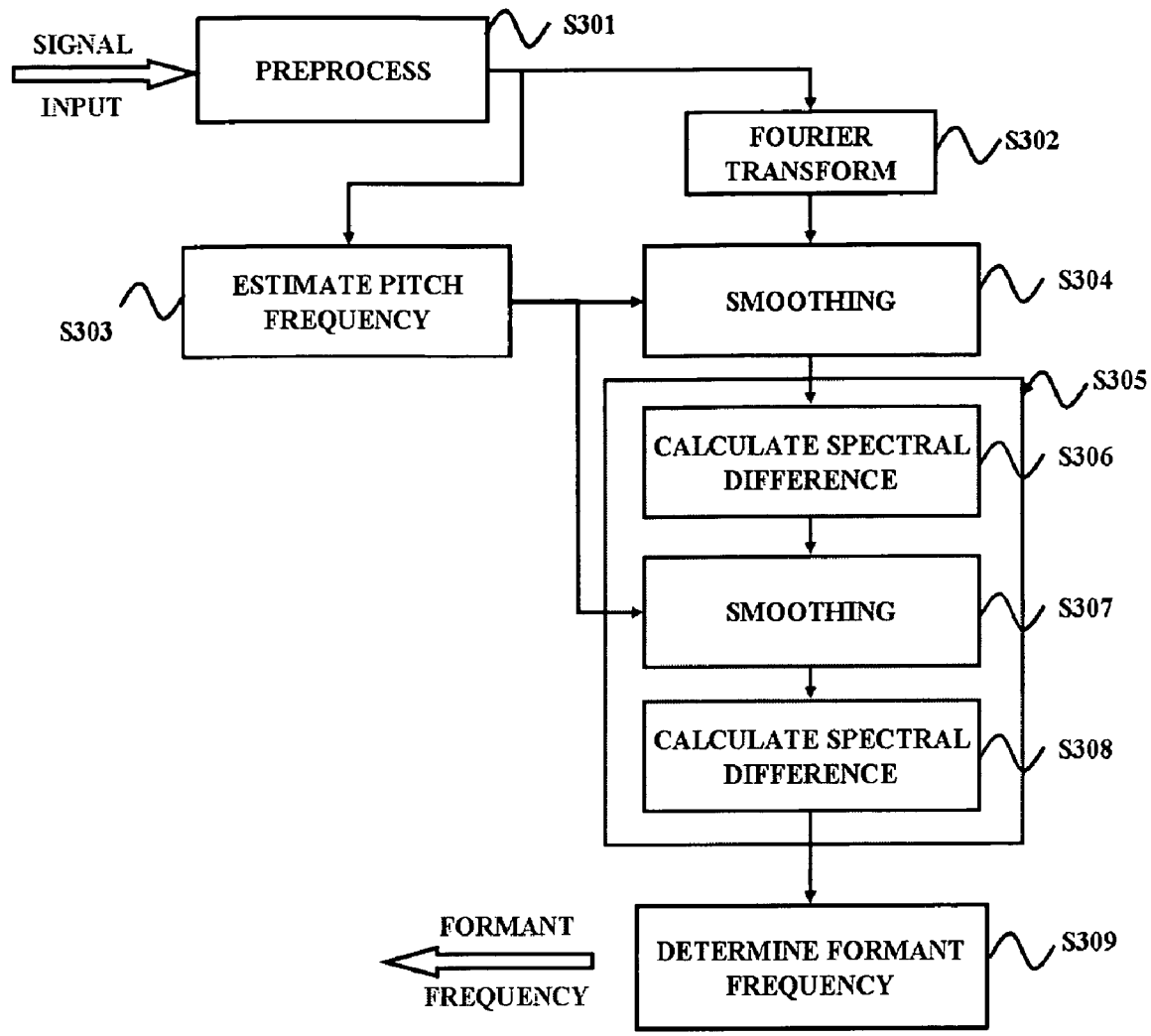
FIG. 3 is a flowchart illustrating a method of estimating a formant frequency in another exemplary embodiment of the present invention.

FIG. 3 is a flowchart illustrating a formant frequency estimation method of another exemplary embodiment of the present invention. The formant frequency estimation method according to the another exemplary embodiment may be implemented by a certain formant frequency estimation apparatus and the formant frequency estimation apparatus will be illustrated in FIG. 6.

In operation S301, the formant frequency estimation apparatus preprocesses an input speech signal. In operation S302, the formant frequency estimation apparatus generates a spectrum by Fast Fourier transforming the preprocessed input speech signal as an equation below;

$$A(k) = A(e^{j2\pi k f_s/N}) = \sum_{n=0}^{N-1} s(n) e^{j2\pi n f_s/N} \quad \text{[Equation 1]}$$

N: number of FFT frequency bin
fs: sampling frequency
k: FFT frequency bins
n: time sample point In operation S303, the formant frequency estimation apparatus estimates a pitch frequency of the preprocessed input speech signal. One of the known methods for estimating pitch frequencies may be used in operation S303.

In operation S304, the formant frequency estimation apparatus smoothes the generated spectrum. In this case, the formant frequency estimation apparatus estimates a pitch frequency of the preprocessed input speech signal. The smoothing of the generated spectrum is based on a moving average of the generated spectrum and smoothes the generated spectrum by using the number of tabs corresponding to the estimated pitch frequency. The operation is illustrated as an equation 2 below;

$$\overline{A}(k) = \sum_{n=0}^{N-1} A(n)h(k-n) \qquad \text{[Equation 2]}$$

N: number of FFT frequency bin
h(n): frequency response of the smoothing filter
k: FFT frequency bins The operation S304 is performed to distinguish between a harmonic component and a formant component, wherein the smoothing has to differ according to the pitch frequency since a gap of the harmonic component differs according to the pitch frequency.

In operation S305, the formant frequency estimation apparatus changes the spectrum by accelerating the smoothed spectrum. The operation S305 is performed to solve a problem of an occurrence of an amplitude difference according to a size of a formant and may include the operations S306 to S308.

In operation S306, the formant frequency estimation apparatus calculates a first spectral difference for the smoothed spectrum. In this case, a component of a neighboring frequency is calculated and may be illustrated as an equation below;

$$dA(k)=A(k)-A(k-1) \qquad \text{[Equation 3]}$$

k: FFT frequency bins

In operation S307, the formant frequency estimation apparatus smoothes a spectrum of the first spectral difference. In this case, the formant frequency estimation apparatus is based on a moving average of the spectrum and smoothes the spectrum by using the number of tabs corresponding to the estimated pitch frequency.

In operation S308, the formant frequency estimation apparatus calculates a second spectral difference for the spectrum of the first spectral difference and may be calculated as the equation 3.

Figure 4:
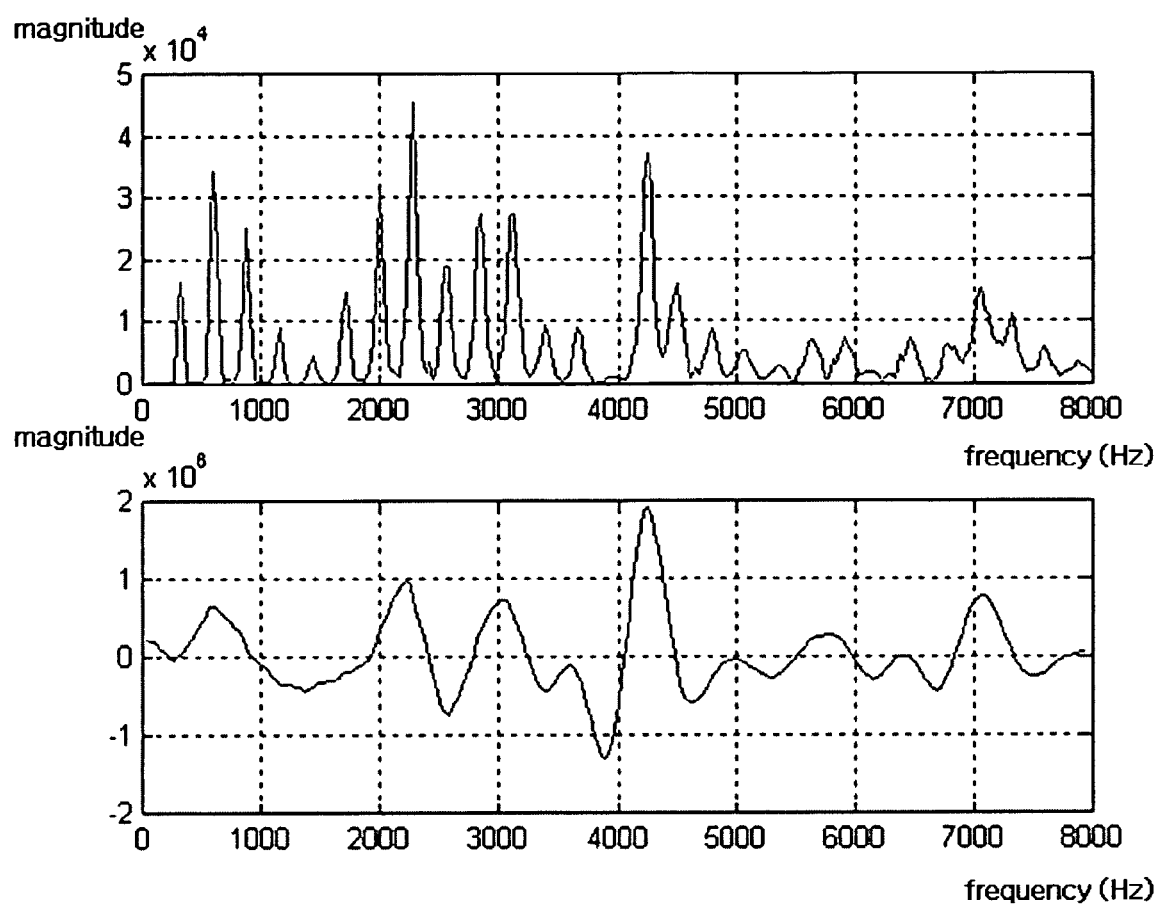
FIG. 4 is a diagram illustrating an exemplary embodiment of a spectrum by accelerating the spectrum.

According to the operations S306 to S308, the repeated operations, such as the calculation of the difference, the smoothing, and the calculation of the difference again, are operations of calculating an acceleration by accelerating spectrums. FIG. 4 is a diagram illustrating an exemplary embodiment of a spectrum changed by accelerating the spectrum. As illustrated in FIG. 4, a peak and a valley of the spectrum smoothed by the acceleration of the spectrum are apparently distinguished.

In operation S309, the formant frequency estimation apparatus determines a formant frequency on the basis of the changed spectrum. In this case, the formant frequency estimation apparatus selects each domain above zero in the accelerated spectrum as a formant candidate; calculates an autocorrelation for each of the formant candidate by using a spectral difference calculated from the accelerated spectrum; and determines the formant candidate of which the autocorrelation is higher than a predetermined threshold value as the formant frequency. The formant frequency may be more precisely obtained by using a parabolic interpolation.

A formant frequency estimation method according to the present invention may be recorded in computer-readable media including a program instruction for executing various operations realized by a computer.

Figure 5:
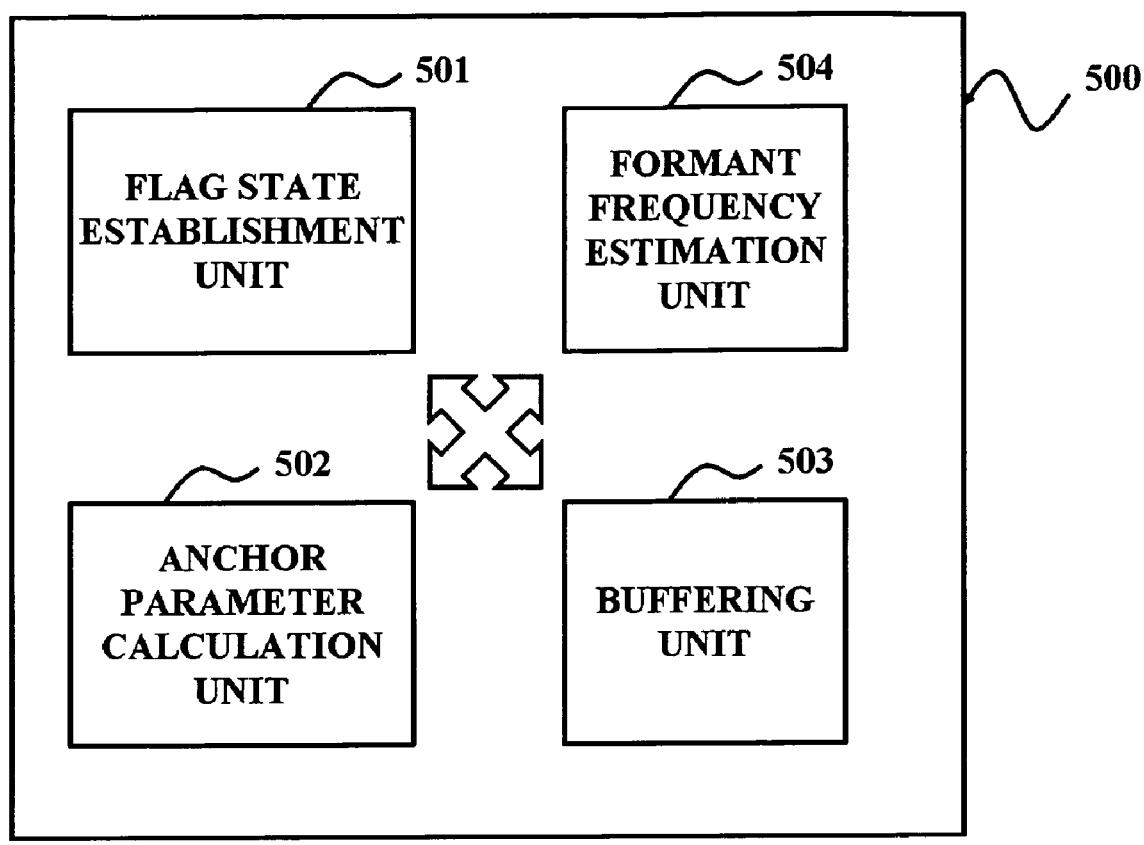
FIG. 5 is a block diagram illustrating a configuration of a formant frequency estimation apparatus according to another exemplary embodiment of the present invention.

FIG. 5 is a block diagram illustrating a configuration of a formant frequency estimation apparatus according to another exemplary embodiment of the present invention. A formant frequency estimation apparatus 500 according to another exemplary embodiment of the present invention may be used for implementing a formant frequency estimation method illustrated in FIG. 2.

The formant frequency estimation apparatus 500 comprises a flag state establishment unit 501, an anchor parameter calculation unit 502, a buffering unit 503 and a formant frequency estimation unit 504.

The flag state establishment unit 501 establishes a flag state backward (backward flag state).

The anchor parameter calculation unit 502 calculates an anchor parameter after preprocessing an input speech signal. The anchor parameter may be a parameter for a voicing estimation. One of the known methods for voicing estimation may be used for calculating the anchor parameter (U.S. Pat. No. 6,640,208; U.S. Pat. No. 5,809,455; US 2002/006229).

The buffering unit 503 executes buffering until the anchor parameter is above a predetermined threshold value; the formant frequency estimation unit 504 estimates a backward formant frequency after the anchor parameter is above the predetermined threshold value.

In this case, a tracking error may be eliminated by starting the formant frequency estimation from a section in which a voice is stable. The formant frequency estimation unit 504 will be described later by referring to the formant frequency estimation apparatus in FIG. 6. The flag state establishment unit 501 changes the flag state and establishes a flag state not-backward (not-backward flag state) after estimating the backward formant frequency. The flag state establishment unit 501, after the flag state is changed, establishes the flag state backward when the anchor parameter becomes smaller than the predetermined threshold value.

Figure 6:
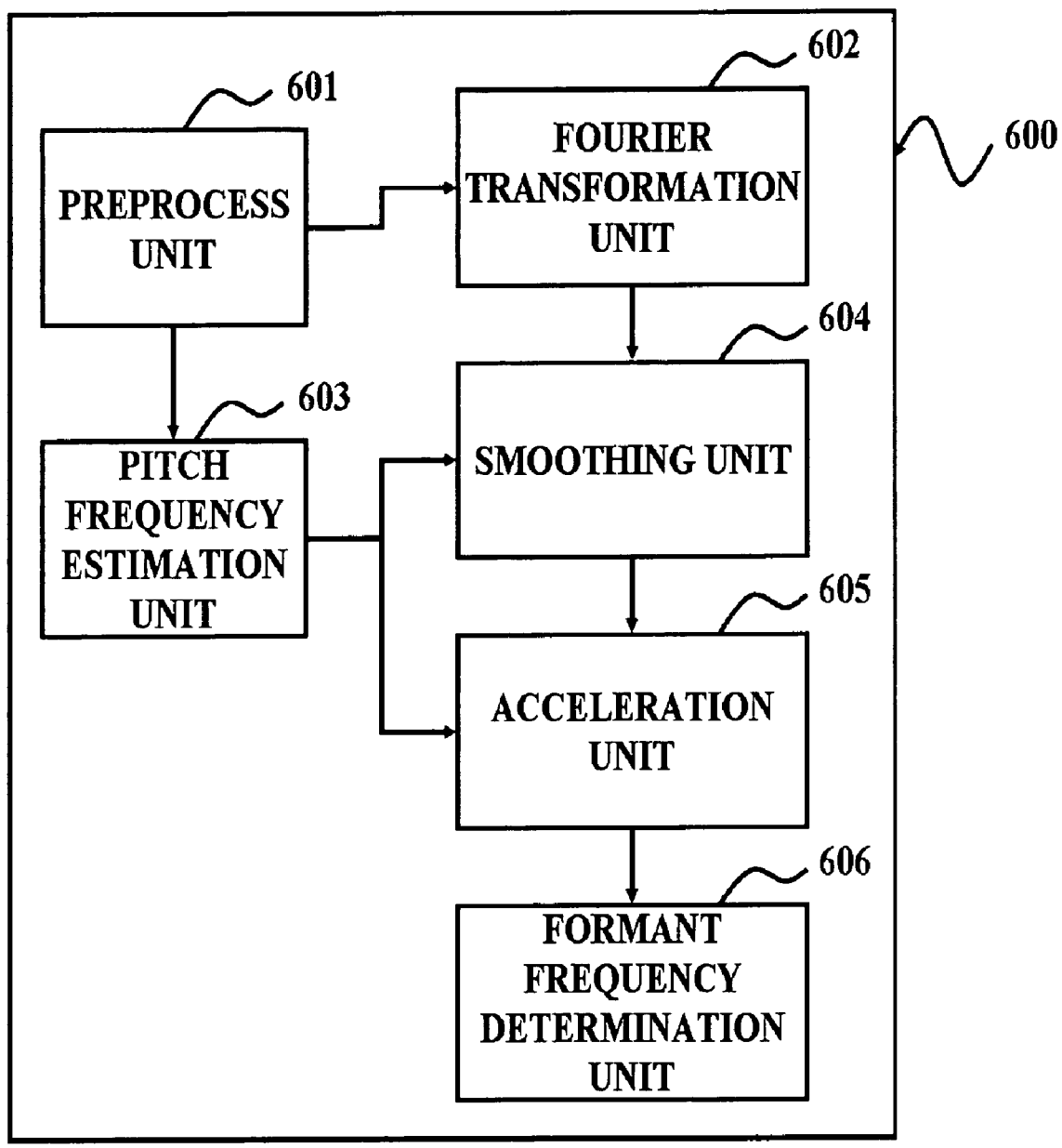
FIG. 6, in another exemplary embodiment of the present invention, is a block diagram illustrating a configuration of a formant frequency estimation apparatus.

FIG. 6, in another exemplary embodiment of the present invention, is a block diagram illustrating a configuration of a formant frequency estimation apparatus. A formant frequency estimation apparatus 600 according to an exemplary embodiment of the present invention may be used for implementing a formant frequency estimation method illustrated in FIG. 3.

The formant frequency estimation apparatus 600 comprises a preprocess unit 601, a Fourier transformation unit 602, a pitch frequency estimation unit 603, a smoothing unit 604, an acceleration unit 605 and a formant frequency determination unit 606.

The preprocess unit 601 preprocesses an input speech signal, and the Fourier transformation unit 602 generates a spectrum by a fast Fourier transforming the preprocessed input speech signal as the equation 1 illustrated in FIG. 1.

The pitch frequency estimation unit 603 estimates a pitch frequency of the preprocessed input speech signal, in this instance, one method of the pitch frequency estimations method may be used.

The smoothing unit 604 smoothes the generated spectrum. In this case, the smoothing unit 604 is based on a moving average of the generated spectrum and smoothes the generated spectrum by using the number of tabs corresponding to the estimated pitch frequency. The above mentioned operation is performed to distinguish between a harmonic component and a formant component and the smoothing has to differ according to the pitch frequency since a gap of the harmonic component differs according to the pitch frequency.

The acceleration unit 605 changes a smoothed spectrum by accelerating the smoothed spectrum. This is to solve a problem of an occurrence of an amplitude difference according to a size of a formant. The acceleration unit 605 calculates a first spectral difference for the smoothed spectrum; smoothes a spectrum of the first spectral difference; and calculates a second spectral difference for the smoothed spectrum of the first spectral difference. The calculation of the spectral difference may be shown as the equation 3. The repeated operations executed by the acceleration unit 605, such as the calculation of the difference, the smoothing and the calculation of the difference again, are operations of calculating an acceleration by accelerating spectrums, as illustrated in FIG. 4, a peak and a valley of the spectrum smoothed by the acceleration of a spectrum are apparently distinguished.

The formant frequency determination unit 606 determines a formant frequency on the basis of the changed spectrum by the acceleration.

In this case, the formant frequency determination unit 606 selects each domain above zero in the accelerated spectrum as a formant candidate, calculates an auto-correlation for each of the formant candidate by using a spectral difference calculated from the accelerated spectrum, and determines the formant candidate of which the auto-correlation is higher than a predetermined threshold value as the formant frequency. The formant frequency may be more precisely obtained by using a parabolic interpolation.

According to the present invention, a formant frequency estimation method which can reliably estimate a formant frequency by changing a spectrum suitable for the estimation of the formant frequency after smoothing and accelerating the spectrum, and an apparatus using the method is provided.

According to the present invention, a formant frequency estimation method which can accurately distinguish between a harmonic component and a formant component by differently executing a smoothing according to a pitch frequency and solve a problem of an occurrence of an amplitude difference according to a size of a formant by executing an acceleration of a spectrum, and an apparatus using the method is provided.

According to the present invention, a formant frequency estimation method which can eliminate a tracking error since the estimation of the formant frequency starts from a section in which a voice is stable, and an apparatus using the method is provided.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.), which may include computer readable code/instructions, data files, data structures, etc. The medium/media may also be a distributed network, so that the computer readable code/instructions is/are stored and executed in a distributed fashion. The computer readable code/instructions may be executed by one or more processors. In addition, the above hardware devices may be configured to act as one or more software modules in order to perform the operations of the above-described exemplary embodiments.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A formant frequency estimation method in speech recognition comprising:
preprocessing an input speech signal and generating a spectrum by fast Fourier transforming the preprocessed input speech signal;
smoothing the generated spectrum;
accelerating the smoothed spectrum; and
determining a formant frequency on the basis of the accelerated spectrum,
wherein the method is performed using at least one processor.

2. The method of claim 1, further comprising
estimating a pitch frequency of the preprocessed input speech signal,
wherein the smoothing of the generated spectrum is based on a moving average of the generated spectrum and smoothes the generated spectrum by using a number of tabs corresponding to the estimated pitch frequency.

3. The method of claim 1, wherein the accelerating the smoothed spectrum comprises:
calculating a first spectral difference for the smoothed spectrum;
smoothing a spectrum of the first spectral difference; and
calculating a second spectral difference for the smoothed spectrum of the first spectral difference.

4. The method of claim 1, wherein the determining a formant frequency comprises:
selecting each domain above zero in the accelerated spectrum as a formant candidate;
calculating an auto-correlation for each of the formant candidates by using a spectral difference calculated from the accelerated spectrum; and
determining the formant candidate of which the auto-correlation is higher than a predetermined threshold value as the formant frequency.

5. The method of claim 4, wherein the determining the formant candidate determines the formant frequency by using parabolic interpolation.

6. At least one computer readable medium comprising computer readable instructions that control at least one processor to implement the method of claim 1.

7. A formant frequency estimation apparatus in speech recognition comprising:
    a preprocess unit to pre-process an input speech signal;
    a fast Fourier transformation unit to Fourier transform the preprocessed input speech signal, and to generate a spectrum;
    a smoothing unit to smooth the generated spectrum;
    an acceleration unit to accelerate the smoothed spectrum; and
    a formant frequency determination unit to determine a formant frequency on the basis of the accelerated spectrum using at least one processor.

8. The apparatus of claim 7, wherein the formant frequency determining unit further comprises:
    a pitch frequency estimation unit to estimate a pitch frequency of a preprocessed input speech signal, and
    wherein the smoothing unit is based on a moving average of the generated spectrum and smoothes the generated spectrum by using the number of tabs corresponding to the estimated pitch frequency.

9. The apparatus of claim 8, wherein the acceleration unit calculates a first spectral difference corresponding to the smoothed spectrum, smoothes a spectrum of the first spectral difference, and calculates a second spectral difference corresponding to the spectrum the smoothed first spectral difference.

10. The apparatus of claim 7, the formant frequency determination unit selects each domain in which it's domain is higher than a zero in the accelerated spectrum, as a formant candidate, calculates an auto-correlation in the each formant candidate by using the calculated spectral difference which is calculated by a spectrum difference in the accelerated spectrum, and determines a formant candidate of which the auto-correlation is higher than a predetermined threshold value as the formant frequency.

* * * * *